United States Patent
Daubitzer et al.

(10) Patent No.: US 9,643,391 B2
(45) Date of Patent: May 9, 2017

(54) DEVICE FOR CONTROLLING THE TEMPERATURE OF AN ENERGY ACCUMULATOR, MORE PARTICULARLY FOR A VEHICLE, AND METHOD FOR PRODUCTION THEREOF

(75) Inventors: Nikolaus Daubitzer, Stuttgart (DE); Lars Ludwig, Altbach (DE); Heiko Neff, Auenwald (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 410 days.

(21) Appl. No.: 14/236,379

(22) PCT Filed: Aug. 9, 2012

(86) PCT No.: PCT/EP2012/065630
§ 371 (c)(1),
(2), (4) Date: Mar. 21, 2014

(87) PCT Pub. No.: WO2013/021037
PCT Pub. Date: Feb. 14, 2013

(65) Prior Publication Data
US 2014/0305622 A1    Oct. 16, 2014

(30) Foreign Application Priority Data

Aug. 11, 2011 (DE) .......................... 10 2011 080 813
Oct. 4, 2011 (DE) .......................... 10 2011 084 003

(51) Int. Cl.
*B32B 37/12* (2006.01)
*B32B 37/00* (2006.01)
(Continued)

(52) U.S. Cl.
CPC ...... *B32B 37/1292* (2013.01); *B32B 37/0076* (2013.01); *H01M 10/613* (2015.04);
(Continued)

(58) Field of Classification Search
CPC .. B32B 37/1292; B32B 37/0076; F28F 3/048; F28F 3/086; F28F 3/10; F28F 3/12;
(Continued)

(56) References Cited

U.S. PATENT DOCUMENTS 3,289,972 A    12/1966  Häfner
3,590,917 A *  7/1971  Huber .................. F25J 3/04412
                                                      165/166

(Continued)

FOREIGN PATENT DOCUMENTS

DE    1 227 752 B    10/1966
DE    102 13 059 C1  12/2003
(Continued)

OTHER PUBLICATIONS

International Search Report, PCT/EP2012/065630, Nov. 21, 2012, 3 pgs.
German Search Report, DE 10 2011 080 813.2, May 9, 2012, 5 pgs.

*Primary Examiner* — Tho V Duong
(74) *Attorney, Agent, or Firm* — Paul D. Strain, Esq.; Strain & Strain PLLC

(57) ABSTRACT

The present invention relates to a device for controlling the temperature of an energy accumulator, more particularly for a vehicle. The device has a first outer wall element and a second outer wall element. A main surface of the first outer wall element and a main surface of the second outer wall element are interconnected by means of a rib made of a hardened adhesive. The rib forms at least one fluid conduction channel for conducting a temperature control fluid between the first outer wall element and the second outer wall element.

12 Claims, 2 Drawing Sheets

(51) Int. Cl.
*H01M 10/625* (2014.01)
*H01M 10/615* (2014.01)
*H01M 10/6556* (2014.01)
*H01M 10/6567* (2014.01)
*H01M 10/613* (2014.01)
*H01M 10/62* (2014.01)

(52) U.S. Cl.
CPC ....... *H01M 10/615* (2015.04); *H01M 10/625* (2015.04); *H01M 10/6556* (2015.04); *H01M 10/6567* (2015.04); *H01M 2220/20* (2013.01)

(58) Field of Classification Search
CPC .. F28F 21/065; F28F 2275/025; F24J 2/0483; F24J 2/202; F24J 2002/4676; F24J 2002/4063; F24J 2002/4603; F28D 1/0316; F28D 1/0366; F28D 1/0375; F28D 9/005; H01M 10/625; H01M 10/615; H01M 10/6556; H01M 10/6567; H01M 10/613; H01M 2220/20
USPC .......................... 165/153, 165, 166, 167, 168
See application file for complete search history.

(56) References Cited

U.S. PATENT DOCUMENTS

| | | | |
|---|---|---|---|
| 4,243,020 A * | 1/1981 | Mier | F24J 2/204 126/670 |
| 5,205,348 A * | 4/1993 | Tousignant | F28F 3/12 165/170 |
| 5,437,941 A | 8/1995 | Arledge et al. | |
| 5,443,926 A | 8/1995 | Holland et al. | |
| 2003/0022008 A1 * | 1/2003 | Jogan | C25D 11/04 428/472.2 |
| 2003/0106680 A1 * | 6/2003 | Serpico | B01D 53/268 165/166 |
| 2005/0100771 A1 | 5/2005 | Vyas et al. | |
| 2006/0016582 A1 | 1/2006 | Hashimoto et al. | |
| 2006/0021745 A1 * | 2/2006 | Fritze | B29C 65/02 165/172 |
| 2006/0115705 A1 * | 6/2006 | Choi | H01M 8/0258 429/457 |
| 2007/0082251 A1 | 4/2007 | Inagaki | |
| 2008/0003492 A1 | 1/2008 | Bates | |

FOREIGN PATENT DOCUMENTS

| | | | |
|---|---|---|---|
| DE | 10 2005 035 258 A1 | 3/2006 | |
| DE | 102010036615 A1 * | 1/2012 | ........... F28D 1/0308 |
| FR | 2314460 A1 * | 1/1977 | ............... F28F 3/10 |
| FR | 2420114 A1 * | 10/1979 | ............... F24J 2/202 |
| GB | 2072323 A * | 9/1981 | ............. F24J 2/0477 |

* cited by examiner

DEVICE FOR CONTROLLING THE TEMPERATURE OF AN ENERGY ACCUMULATOR, MORE PARTICULARLY FOR A VEHICLE, AND METHOD FOR PRODUCTION THEREOF

CROSS-REFERENCE TO RELATED PATENT APPLICATIONS

This application is a National Stage of International Application No. PCT/EP2012/065630, filed Aug. 9, 2012, which is based upon and claims the benefit of priority from prior German Patent Applications No. 10 2011 080 813.2, filed Aug. 11, 2011, and No. 10 2011 084 003.6, filed Oct. 4, 2011, the entire contents of all of which are incorporated herein by reference in their entirety.

The present invention relates to a device for controlling the temperature of an energy store, in particular for a vehicle, and a method for producing a device for controlling the temperature of an energy store, in particular for a vehicle.

In a battery cooler for a vehicle, it is advantageous to provide customer-specific cooler solutions with correspondingly specific fluid guides. This may, for example, be achieved by the use of a modular construction system, but this constitutes a solution which is variable only within specific limits.

An object of the present invention is to provide an improved device for controlling the temperature of an energy store, in particular for a vehicle, and an improved method for producing a device for controlling the temperature of an energy store, in particular for a vehicle.

This object is achieved by a device for controlling the temperature of an energy store, in particular for a vehicle, and by a method for producing a device for controlling the temperature of an energy store, in particular for a vehicle, according to the independent patent claims.

A device for controlling temperature, for example, a battery cooler, may be constructed in a bonded manner. It is thereby possible to provide a temperature control device or a cooler with bonded construction for controlling the temperature or cooling of energy stores in vehicle applications. In this instance, using adhesive, it is possible both to produce a connection of outer wall elements of the device and to form at least one fluid guiding channel for guiding temperature control fluid.

Advantageously, the bonded construction enables cost-effective production of individual components of the device and the device itself, linked with low specific investment costs. Furthermore, there result a low number of individual components and a low weight of the device and a reduction of cost-intensive customer-specific tools and components. Another advantage is that in particular costs of shaping tools, fluid guiding components, which bring about the guiding of the fluid, and a joining process can also be reduced. The fluid guiding or the at least one fluid guiding channel can be produced in a variable manner independently of production limits relating to the original or shaped form so that the advantage of a geometrically substantially freely selectable fluid guiding structure is produced. Additional advantageous aspects are a cost reduction resulting from the use of advantageous method techniques for producing the device, weight-saving as a result of low material use, a reduction of passive thermal mass and obtaining the structural strength of the used outer wall elements or semi-finished products.

The present invention makes provision for a device for controlling the temperature of an energy store, in particular for a vehicle, wherein the device has a first outer wall element and a second outer wall element, characterized in that a main surface of the first outer wall element and a main surface of the second outer wall element are connected to each other by means of at least one rib of hardened adhesive, wherein the rib forms at least one fluid guiding channel for guiding a temperature control fluid between the first outer wall element and the second outer wall element.

A vehicle in this instance is intended to be understood to be a vehicle, in particular a road-bound motor vehicle, such as, for example, a passenger vehicle, truck, bus or other utility vehicle. The vehicle may in particular have an electrical or partially electrical drive. The energy store may be constructed in this instance to store electrical energy for driving the vehicle. The energy store may have a preferred operating temperature range. Using the device for temperature control, a temperature of the energy store can be kept in the operating temperature range or within a definable tolerance range around the temperature range. To this end, the device for temperature control may be constructed in order to enable cooling of the energy store. Additionally or alternatively, the device for temperature control may be constructed in order to enable heating of the energy store. Consequently, the device may also generally be said to be a heat transfer device. A heat transfer with respect to the energy store can in this instance be carried out via the outer wall elements and the temperature control fluid. The outer wall elements may be produced from metal sheet or plastics material and films, aluminum sheets or the like. The outer wall elements may be housing halves or the like which together form an outer wall of the device. The main surfaces may be inner main surfaces of the outer wall elements. During operation of the device, the main surfaces are partially in contact with the temperature control fluid, which can be guided inside the device. The energy store of the vehicle can be brought into thermal contact with an outer surface of one or both outer wall elements, which outer surface is facing away from the main surface. The temperature control fluid may be a cooling means or refrigeration means or another heat transfer means. The outer wall elements are, for example, connected to each other by means of the at least one rib in such a manner that the main surfaces of the outer wall elements are spaced apart from each other. The adhesive may have an organic or inorganic base. The adhesive may also be chemically or physically hardened. For example, the adhesive may also be understood to be a joining means, an adhesive mass or sealing mass.

According to one embodiment, the at least one rib may be formed as a peripheral adhesive bead which connects the outer wall elements in edge regions of the main surfaces. The adhesive bead may consequently have a path which is enclosed. The adhesive bead may in this instance connect the outer wall elements along peripheral regions of the main surfaces. The edge regions or peripheral regions may extend along a periphery of the main surfaces. Such an embodiment affords the advantage that a sealing of the at least one fluid guiding channel can be achieved with respect to an environment of the device. In addition, pressure resistance of the device can be improved.

The at least one rib may also be formed as at least one adhesive bead which connects the outer wall elements in inner regions of the main surfaces with spacing from edge regions. The at least one adhesive bead in the internal regions may be provided in addition to the at least one adhesive bead in the edge regions. Such an embodiment affords the advantage that pressure resistance of the device can be improved. In addition, by means of the at least one adhesive bead, a customer-specific or variable structure of the fluid guiding or flow field construction can be achieved in the internal regions.

Furthermore, the first outer wall element and/or the second outer wall element may have at least one spacer for defining a spacing of the main surfaces of the outer wall elements with respect to each other. Such a spacer may be constructed integrally with the outer wall element. The at least one spacer may be formed as a projection with respect to the main surface of the outer wall element, at which surface the spacer is formed. The at least one spacer may be in contact with the main surface of the other outer wall element. Such a spacer affords the advantage that, for example, a defined compression of the at least one rib or joining layer is possible so that a spacing of the main surfaces of the outer wall elements does not fall below a minimum spacing. The at least one spacer may in this instance be constructed, for example, as a knob or a rib. Alternatively, the at least one spacer may also be constructed as a separate insert. The at least one spacer may also already be incorporated in the adhesive (for example, glass beads).

In addition, the first outer wall element or the second outer wall element may have a first fluid opening for the temperature control fluid and the first outer wall element or the second outer wall element may have a second fluid opening for the temperature control fluid. In this instance, one of the fluid openings may act as a fluid supply and another of the fluid openings may act as a fluid discharge. Consequently, the temperature control fluid may, for example, flow from the first fluid opening through the at least one fluid guiding channel to the second fluid opening. A positioning of the fluid openings, depending on requirements, may be divided, for example, with respect to the first outer wall element and the second outer wall element or is suitable and freely selectable with respect to an individual outer wall element. Consequently, at least one of the outer wall elements may have a geometric construction for a fluid supply. Such an embodiment affords the advantage that a supply with the temperature control fluid is possible in a flexible manner which can be adapted in a customer-specific manner.

In this instance, a first fluid connection element which is fitted to the first fluid opening, and a second fluid connection element which is fitted to the second fluid opening may be provided. The fitting of the fluid connection elements or connection pieces, such as, for example, hose connection pieces, screw-in connection pieces, rapid coupling connections or the like, can be carried out in this instance, for example, both by means of adhesive or sealing masses and by means of thermal or mechanical joining methods. Such an embodiment affords the advantage that a supply with the temperature control fluid can already be prepared from the device side so that a connection of the device, for example, to a fluid circuit of a vehicle is facilitated.

The first outer wall element and/or the second outer wall element may also have at least one securing region for securing the outer wall elements to each other by means of a mechanical or thermal joining operation. The at least one securing region may in this instance enable securing directly or indirectly. For example, the at least one securing region may be constructed to bring about securing in cooperation with at least one securing means. The at least one securing region may be constructed to enable the outer wall elements to be secured to each other by means of a mechanical or thermal joining method, such as, for example, screwing, riveting, spot-welding or the like. The securing region may in this instance be spaced apart with respect to a region of the outer wall elements covered by the at least one rib.

Accordingly, the first outer wall element and the second outer wall element may be connected to each other within the at least one securing region by means of a mechanical or thermal joining connection. Such an additional joining connection affords the advantage that the structural strength of the device can additionally be further increased if necessary.

In particular, the first outer wall element and the second outer wall element may be constructed in a plate-like manner. The at least one rib may also have a first peripheral adhesive bead which connects the outer wall elements in edge regions of the main surfaces and at least one non-closed adhesive bead which connects the outer wall elements in inner regions of the main surfaces spaced apart from edge regions. Consequently, the device may, for example, be a cooling plate. Such an embodiment affords the advantage that a heat-transfer face and a heat-transfer power can be optimized even further as a result of the plate-like configuration. In this instance, a use of aluminum sheets for at least one of the outer wall elements is advantageous because of the good heat conduction.

The present invention further makes provision for a method for producing a device for controlling the temperature of an energy store, in particular for a vehicle, wherein the method has the following steps:

providing a first outer wall element and a second outer wall element;

applying at least one rib of an adhesive to a main surface of the first outer wall element, wherein the rib forms at least one fluid guiding channel for guiding a temperature control fluid along the main surface of the first outer wall element; placing a main surface of the second outer wall element on the main surface of the first outer wall element; and hardening the adhesive of the at least one rib in order to connect the first outer wall element and the second outer wall element to each other and to produce the device for temperature control.

By carrying out the method, a device mentioned above can be produced in an advantageous manner. The application of the adhesive or the application of the adhesive or sealing mass may, for example, be carried out both via a silk screen printing method or a CNC-controlled metering application and can consequently be almost freely selected in geometric terms. As a result of the variability of the application of the adhesive for the fluid guiding channel for guiding the temperature control fluid, various types of throughflow are possible, such as, for example, an I-shaped, U-shaped, S-shaped or W-shaped throughflow or a throughflow having one or more redirections. The hardening of the adhesive or the adhesive or sealing mass joining operation can be adapted to the type of adhesive or joining means used or selected. Even when the hardening operation of the adhesive can be accelerated, for example, by the introduction of heat, the structural strength of the outer wall elements used is not influenced in a negative manner in contrast to a joining operation by means of soldering or welding.

According to an embodiment of the method, in the application step, at least one additional rib of adhesive can be applied to the main surface of the second outer wall element. Such an embodiment affords the advantage that, consequently, the cooling fluid guiding can be produced by means of variable application of a suitable adhesive or sealing mass between the two outer wall elements. The rib is applied to at least one outer wall element and subsequently joined to at least one additional outer wall element. The at least one additional rib on the second outer wall element may be constructed so as to be offset or to overlap with the at least one rib on the first outer wall element. For the ribs on the two outer wall elements, the same or a different adhesive may be used in each case.

Alternatively, it is also possible for a cell base or a wall region of an energy store to form an outer wall element of the above-described device in a structural unit. It is advantageous for the device to be formed in an open configuration so that an outer wall element such as a covering sheet, an adhesive bead and a wall region of one cell or of an energy store acting as used components are joined together or connected.

Advantageous embodiments of the present invention are explained in greater detail below with reference to the appended drawings, in which.

In the following description of the preferred embodiments of the present invention, the same or similar reference numerals are used for the elements which are illustrated in the various drawings and which function in a similar manner, a repeated description of these elements being omitted.

Figure 1:
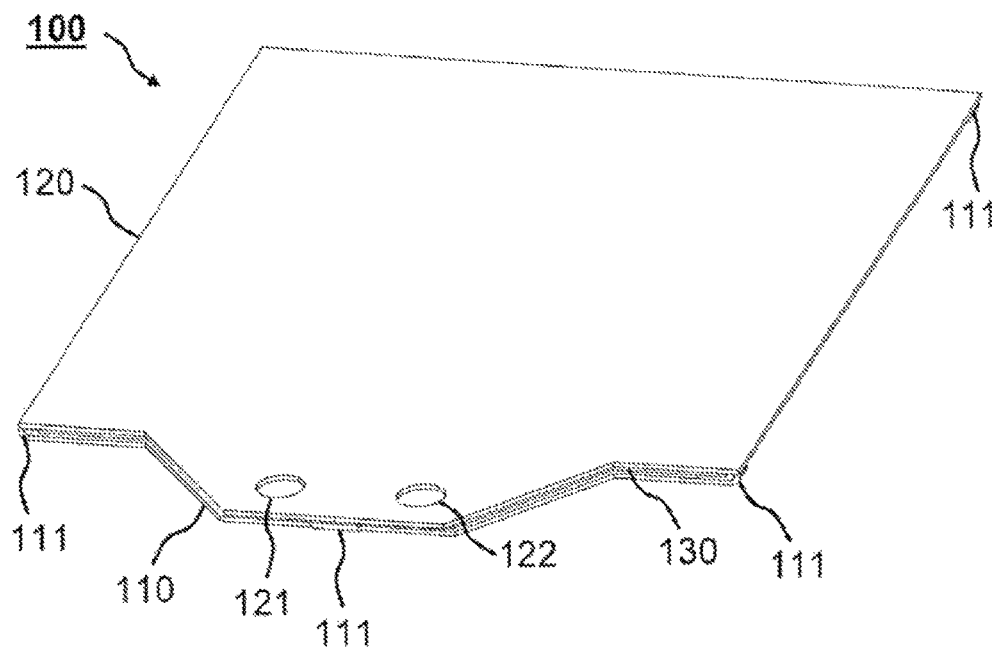
FIG. 1 shows a device according to an embodiment of the present invention.

FIG. 1 shows a device 100 for controlling the temperature of an energy store, in particular for a vehicle, according to an embodiment of the present invention. The device 100 may, for example, be a cooling plate. The device 100 has a first outer wall element 110 or a lower covering sheet, spacers 111, a second outer wall element 120 or an upper covering sheet, a first fluid opening 121, a second fluid opening 122 and adhesive ribs 130 or adhesive beads or a joining layer of adhesive mass. In the illustration of FIG. 1, only one adhesive rib 130 can be seen, with additional adhesive ribs 130 being covered by the second outer wall element 120. The adhesive ribs 130 of the device 100 can be seen in FIG. 3 and are described more extensively with reference to FIG. 3. FIG. 1 further shows, for example, four spacers 111, the device 100 being able to have at least one additional spacer 111, which may be covered by the second outer wall element 120.

The first outer wall element 110 and the second outer wall element 120 have a rectangular horizontal projection having a trapezoidal protuberance at one side. The horizontal projection of the first outer wall element 110 corresponds in this instance within production tolerances to the horizontal projection of the second outer wall element 120. A base face of the first outer wall element 110 may be slightly smaller than a base face of the second outer wall element 120. The first outer wall element 110 and the second outer wall element 120 are constructed in a plate-like manner. Consequently, the second outer wall element 120 has a planar outer surface. Even if it cannot be seen in FIG. 1, the first outer wall element 110 may also have a planar outer surface. Inner surfaces or inner main surfaces of the first outer wall element 110 and the second outer wall element 120 may also be planar surfaces. In the illustration of FIG. 1, the second outer wall element 120 is arranged so as to be stacked on the first outer wall element 110, the inner main surfaces of the outer wall elements 110, 120 facing each other and the adhesive ribs 130 being arranged between the outer wall elements 110, 120.

The first outer wall element 110 has the spacers 111. The spacers 111 are constructed integrally with the first outer wall element 110. The spacers 111 are formed in the region of a peripheral edge of the first outer wall element 110. In particular, the spacers 111 are formed as bent projections of the first outer wall element 110. In this instance, the projections extend with respect to the inner main surface of the first outer wall element 110 in the direction towards the inner main surface of the second outer wall element 120. The spacers 111 are located in contact with portions of the inner main surface of the second outer wall element 120. A positioning of the spacers 111 is described in greater detail with reference to FIG. 3.

The second outer wall element 120 has the first fluid opening 121 and the second fluid opening 122. For example, the first fluid opening 121 is constructed in a circular manner and the second fluid opening 122 is constructed in a circular manner. The first fluid opening 121 and the second fluid opening 122 are arranged in the region of the trapezoidal protuberance of the horizontal projection of the second outer wall element 120. The first fluid opening 121 and the second fluid opening 122 are spaced apart from each other. The first fluid opening 121 and the second fluid opening 122 are spaced apart with respect to a peripheral edge of the second outer wall element 120. In this instance, the first fluid opening 121 and the second fluid opening 122 are, for example, spaced further apart from each other than from a peripheral edge of the second outer wall element 120. In practice, however, according to other embodiments of the present invention, any shapes and positionings of the fluid openings are possible. For example, the first fluid opening 121 may serve to supply temperature control fluid to the device 100 and the second fluid opening 122 may serve to discharge temperature control fluid from the device 100, or vice versa.

The outer adhesive rib 130 (which can be seen in FIG. 1) of the device 100 is arranged along peripheral edges or circumferential edges of the inner main surfaces of the outer wall elements 110, 120. The outer adhesive rib 130 may be constructed to seal at least one fluid guiding channel which is formed between the outer wall elements 110, 120 and by means of the adhesive ribs 130 inside the device 100 with respect to an environment of the device 100. A precise path of the outer adhesive rib 130 and a positioning and arrangement of additional adhesive ribs 130 of the device 100 are explained in greater detail with reference to FIG. 3.

Figure 2:
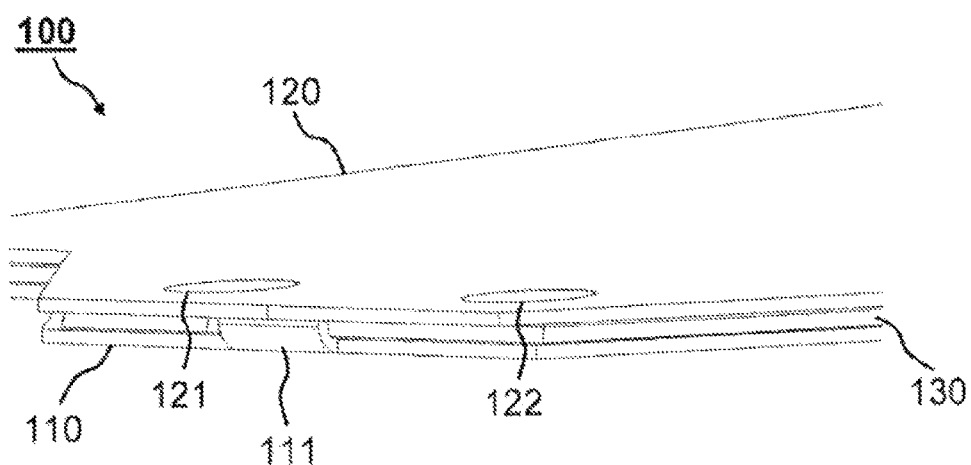
FIG. 2 shows a cut-out of the device of FIG. 1.

FIG. 2 shows an enlarged cut-out of the device 100 from FIG. 1 according to an embodiment of the invention. There are shown a portion of the first outer wall element 110, one of the spacers 111, a portion of the second outer wall element 120, the first fluid opening 121, the second fluid opening 122 and a portion of the adhesive rib 130, more precisely the outer adhesive rib 130. In particular, FIG. 2 shows an enlarged cut-out of the device 100 in the region of the trapezoidal protuberance in the otherwise rectangular horizontal projection of the outer wall elements 110, 120.

Figure 3:
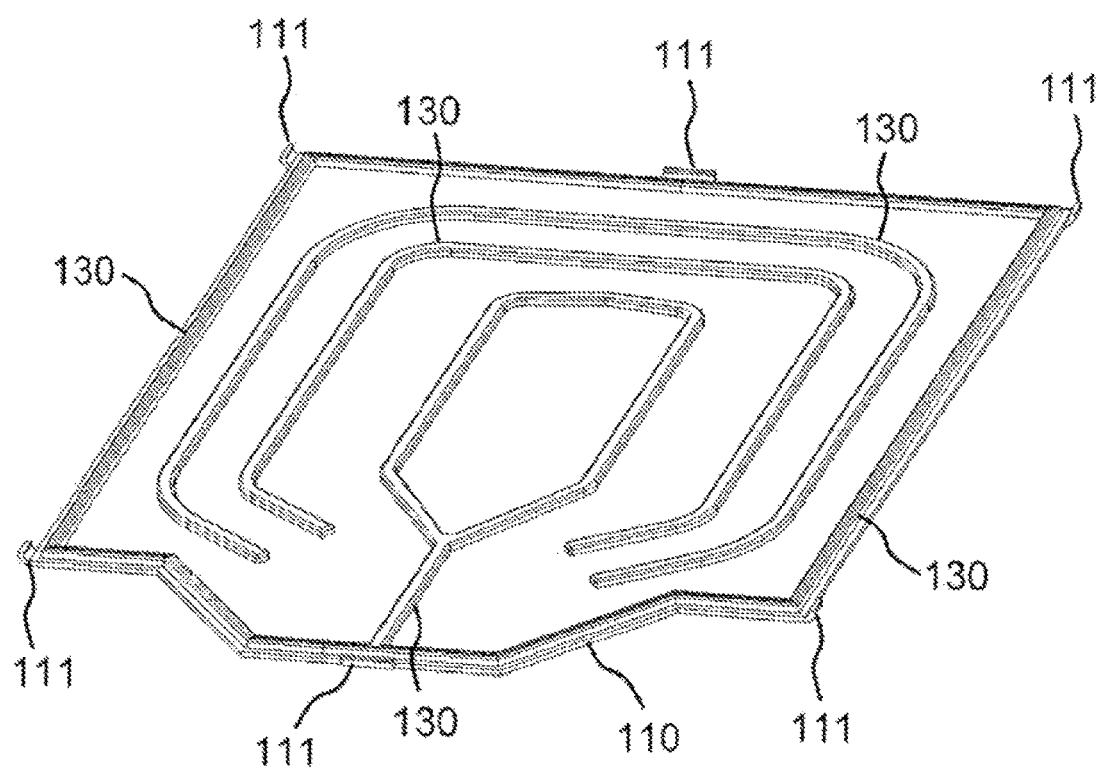
FIG. 3 shows portions of the device of FIG. 1.

FIG. 3 shows portions of the device from FIG. 1, the second outer wall element being omitted in FIG. 3 or not being illustrated according to an embodiment of the invention. In this instance, the first outer wall element 110, for example, six spacers 111 and, for example, four adhesive ribs 130 are shown. In respect of the first outer wall element 110, in particular the inner main surface is illustrated in this instance. The adhesive ribs 130 are arranged on the inner main surface of the first outer wall element 110.

The outer adhesive rib 130 which has already been mentioned above is applied in a peripheral manner along peripheral edges of the inner main surface of the first outer wall element 110. The outer adhesive rib 130 consequently has a path which is enclosed. The outer adhesive rib 130 has, for example, a small spacing with respect to the peripheral edges of the inner main surface of the first outer wall element 110. Alternatively, the outer adhesive rib 130 may also terminate with the peripheral edges of the first outer wall element 110.

A first inner adhesive rib 130 is spaced further apart from the peripheral edges than the outer adhesive rib 130. The first inner adhesive rib 130 consequently extends inside the closed outer adhesive rib 130. The first inner adhesive rib 130 has a horseshoe-like open path having two ends. The two ends of the first inner adhesive rib 130 are arranged in the region of the trapezoidal protuberance or adjacent thereto.

A second inner adhesive rib 130 is arranged within the first inner adhesive rib 130. A path of the second inner adhesive rib 130 in this instance corresponds to the path of the first inner adhesive rib 130. Consequently, the second inner adhesive rib 130 is spaced further apart from the peripheral edges than the first inner adhesive rib 130.

A third inner adhesive rib 130 extends from the outer adhesive rib 130 in the region of the trapezoidal protuberance away from the peripheral edge as far as a branching location. At the branching location, the third inner adhesive rib 130 branches into two branches and forms a portion with a closed path within the second inner adhesive rib 130. Consequently, the portion with a closed path of the third inner adhesive rib 130 is spaced further from the peripheral edges than the second inner adhesive rib 130.

The spacers 111 are bent projections which are formed integrally with the first outer wall element 110 on a circumferential peripheral edge of the first outer wall element 110. A spacer 111 is arranged at each of the four corners of the rectangular horizontal projection of the first outer wall element 110. Another spacer 111 is formed in the region of the trapezoidal protuberance and yet another spacer 111 is, for example, formed so as to face a side of the horizontal projection opposite the trapezoidal protuberance.

The embodiments described are selected merely by way of example and can be combined with each other. Embodiments of the present invention may also have only portions of the elements shown in the figures.

The invention claimed is:

1. A device for controlling the temperature of an energy store comprising:
   a first outer wall element,
   a second outer wall element,
   a plurality of rib elements comprising a hardened adhesive material,
   wherein the first outer wall element and the second outer wall element each comprise a planar inner main surface and a planar outer surface,
   wherein the first outer wall element and the second outer wall element each comprise a horizontal shape having a trapezoidal protuberance on one side,
   wherein the first outer wall element or the second outer wall element comprises at least one spacer for defining a width of a spacing between the main surfaces of the outer wall elements, wherein the spacer comprises a bent projection of the first outer wall element or the second outer wall element,
   wherein the first outer wall element or the second outer wall element comprises a first fluid opening for the temperature control fluid and the first outer wall element or the second outer wall element has a second fluid opening for the temperature control fluid, wherein the first fluid opening and the second fluid opening are arranged in the trapezoidal protuberance,
   wherein the first outer wall element or the second outer wall element is in contact with the energy store,
   wherein at least one rib element of the plurality of rib elements is arranged along a peripheral edge of the first outer wall element and the second outer wall element and forms a complete loop,
   wherein the main surface of the first outer wall element and the main surface of the second outer wall element are connected to each other by the plurality of rib elements,
   wherein the plurality of rib elements bound one or more fluid channels for guiding a temperature control fluid between the first outer wall element and the second outer wall element.

2. The device as claimed in claim 1,
   wherein the least one rib element of the plurality of rib elements is formed as a peripheral adhesive bead which connects the outer wall elements in edge regions of the main surfaces.

3. The device as claimed in claim 1,
   wherein the least one rib element of the plurality of rib elements is formed as at least one adhesive bead which connects the outer wall elements in inner regions of the main surfaces with spacing from edge regions.

4. The device as claimed in claim 1,
   wherein a first fluid connection element is fitted to the first fluid opening, wherein a second fluid connection element is fitted to the second fluid opening.

5. The device as claimed in claim 1,
   wherein the first outer wall element and the second outer wall element are connected to each other within at least one securing region by a mechanical or thermal joining connection.

6. The device as claimed in claim 1,
   wherein the first outer wall element and the second outer wall element are planar,
   wherein the least one rib element of the plurality of rib elements arranged along a peripheral edge of the first outer wall element and the second outer wall element has a first peripheral adhesive bead which connects the outer wall elements in edge regions of the main surfaces,
   wherein further rib elements of the plurality of rib elements are arranged between the first outer wall and the second outer wall not along the peripheral edge and comprise at least one adhesive bead that does not form a complete loop which connects the outer wall elements in inner regions of the main surfaces.

7. A method for producing a device according to claim 1 comprising the following steps:
   providing a first outer wall element and a second outer wall element;
   applying at least one rib of an adhesive to a main surface of the first outer wall element, wherein the rib forms at least one fluid guiding channel for guiding a temperature control fluid along the main surface of the first outer wall element;
   placing a main surface of the second outer wall element on the main surface of the first outer wall element; and
   hardening the adhesive of the at least one rib in order to connect the first outer wall element and the second outer wall element to each other and to produce the device for temperature control,
   wherein, in the application step, at least one additional rib of adhesive is applied to the main surface of the second outer wall element to form a further fluid guiding channel, wherein the at least one rib is applied using silk screen printing or using a CNC-controlled metering application.

8. The device as claimed in claim 1, wherein the plurality of rib elements comprises rib elements consisting of different materials.

9. The device as claimed in claim 1, wherein the first outer wall element or the second outer wall element are formed from a cell base or a wall region of an energy store such that the device is integral with the cell base or the energy store.

10. The method according to claim 7, wherein the at least one rib is applied using silk screen printing.

11. The method according to claim 7, wherein the at least one rib is applied using a CNC-controlled metering application.

12. A device for controlling the temperature of an energy store comprising:
a first outer wall element,
a second outer wall element,
a plurality of rib elements comprising a hardened adhesive material,
wherein the first outer wall element and the second outer wall element each comprise a planar inner main surface and a planar outer surface,
wherein the first outer wall element and the second outer wall element each comprise a horizontal shape having a trapezoidal protuberance on one side,
wherein the first outer wall element or the second outer wall element comprises at least one spacer for defining a width of a spacing between the main surfaces of the outer wall elements, wherein the spacer comprises a bent projection of the first outer wall element or the second outer wall element, wherein the first outer wall element or the second outer wall element comprises a first fluid opening for the temperature control fluid and the first outer wall element or the second outer wall element has a second fluid opening for the temperature control fluid, wherein the first fluid opening and the second fluid opening are arranged in the trapezoidal protuberance, wherein the first outer wall element or the second outer wall element is in contact with the energy store, wherein at least one rib element of the plurality of rib elements is arranged along a peripheral edge of the first outer wall element and the second outer wall element and forms a complete loop, wherein the main surface of the first outer wall element and the main surface of the second outer wall element are connected to each other by the plurality of rib elements, wherein the plurality of rib elements bound one or more fluid channels for guiding a temperature control fluid between the first outer wall element and the second outer wall element, wherein the first outer wall element or the second outer wall element are formed from a cell base or a wall region of an energy store such that the device is integral with the cell base or the energy store.

* * * * *